United States Patent
Mikura

(10) Patent No.: US 8,690,264 B2
(45) Date of Patent: Apr. 8, 2014

(54) WHEEL STRUCTURE FOR SADDLE-RIDE TYPE VEHICLE

(75) Inventor: Keita Mikura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 13/076,020

(22) Filed: Mar. 30, 2011

(65) Prior Publication Data

US 2011/0241415 A1    Oct. 6, 2011

(30) Foreign Application Priority Data

Mar. 31, 2010    (JP) .................................. 2010-083182

(51) Int. Cl.
B60B 1/00    (2006.01)

(52) U.S. Cl.
USPC ...... 301/6.9; 301/6.8; 188/18 A; 188/218 XL

(58) Field of Classification Search
USPC ....... 188/17, 18 A, 218 XL; 301/6.1, 6.7, 6.8, 301/6.9
See application file for complete search history.

(56) References Cited

U.S. PATENT DOCUMENTS

| | | | |
|---|---|---|---|
| 1,679,453 A | | 8/1928 | Wagenhorst |
| 4,456,099 A | * | 6/1984 | Kawaguchi .................. 188/71.6 |
| 4,550,809 A | * | 11/1985 | Kawaguchi .................. 188/18 A |
| 4,634,189 A | | 1/1987 | LeBlond et al. |
| 4,641,731 A | * | 2/1987 | Kawaguchi et al. ..... 188/218 XL |
| 4,662,482 A | * | 5/1987 | Bass ........................... 188/18 A |
| 4,716,993 A | * | 1/1988 | Bass ........................... 188/18 A |
| 5,016,737 A | * | 5/1991 | Hayashi et al. ........... 188/181 A |
| 6,561,298 B2 | * | 5/2003 | Buell et al. .................... 180/221 |
| 2008/0272644 A1 | | 11/2008 | Durrani |
| 2013/0026731 A1 | * | 1/2013 | Mikura et al. ................ 280/279 |

FOREIGN PATENT DOCUMENTS

| | | |
|---|---|---|
| JP | 581716 A | 10/1946 |
| JP | 2008-030648 A | 2/2008 |
| JP | 2008/030648 A | 2/2008 |

* cited by examiner

Primary Examiner — Jason S Morrow

(74) Attorney, Agent, or Firm — Birch, Stewart, Kolasch & Birch, LLP

(57) ABSTRACT

A wheel for saddle-ride type vehicle is formed of a hub part, multiple spoke parts, and a rim part. The wheel includes disc attachment boss parts to which a brake disc is attached and which are provided, in a manner disposed in a vehicle width direction, integrally on one side of the multiple spoke parts, at middle portions thereof in a radial direction of the wheel. Each of the multiple spoke parts has a crotch part where one hub-side spoke part splits into two rim-side spoke parts in the vehicle side view.

9 Claims, 7 Drawing Sheets

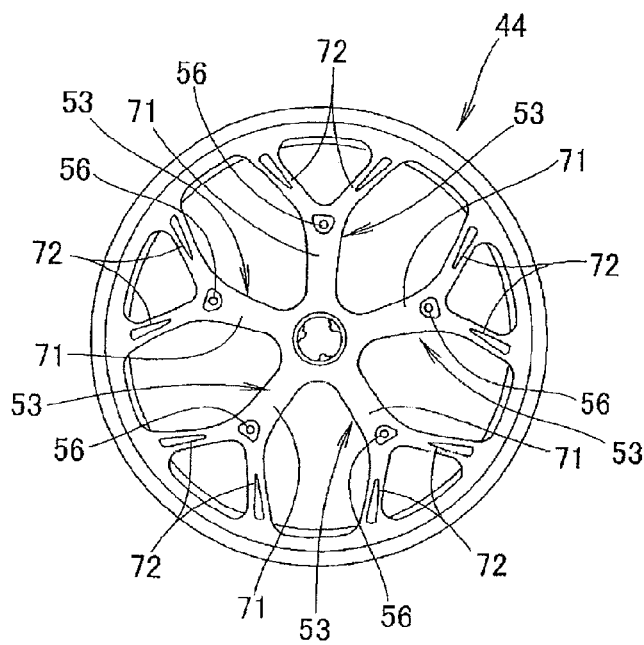
FIG. 7(a) EMBODIMENT
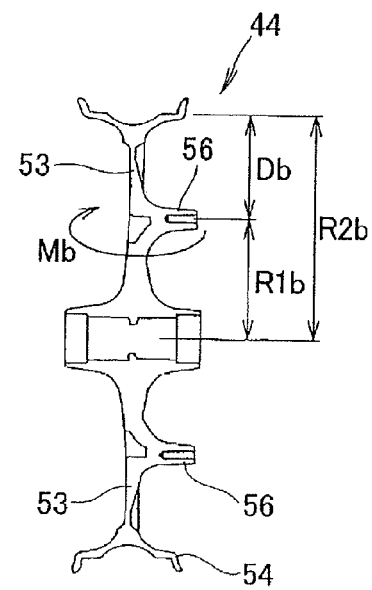
FIG. 7(b) EMBODIMENT
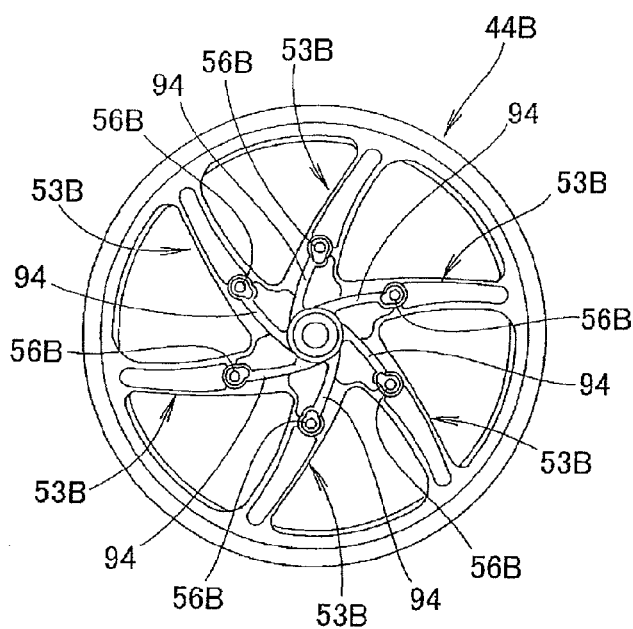
FIG. 7(c) COMPARATIVE EMBODIMENT
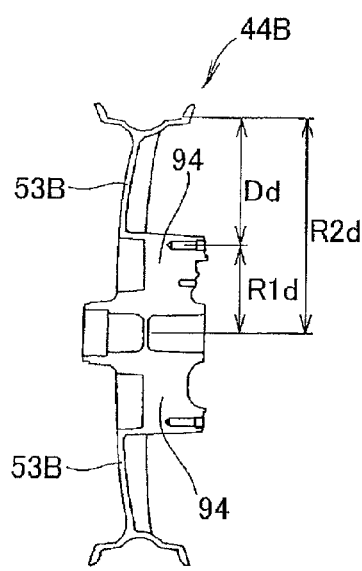
FIG. 7(d) COMPARATIVE EMBODIMENT

WHEEL STRUCTURE FOR SADDLE-RIDE TYPE VEHICLE

CROSS-REFERENCE TO RELATED APPLICATIONS

The present application claims priority under 35 USC 119 to Japanese Patent Application No. 2010-083182 filed on Mar. 31, 2010 the entire contents of which are hereby incorporated by reference.

BACKGROUND OF THE INVENTION

1. Field of the Invention

The present invention relates to an improvement in a wheel structure for a saddle-ride type vehicle in which a spoke part of the wheel includes a disc attachment boss part.

2. Description of Background Art

For motorcycles including a wheel formed of a hub part, spoke parts extending from the hub part to the outside, and a rim part connecting leading end portions of the respective spoke parts, a wheel structure is known wherein the spoke parts of the wheel includes disc attachment boss parts for attaching a brake disc thereto. See, for example, Japanese Patent Application Publication No. 2008-030648, FIGS. 5 and 7.

In FIG. 5 of Japanese Patent Application Publication No. 2008-030648, a wheel (400) (the number in parentheses indicates reference numeral described in Japanese Patent Application Publication No. 2008-030648. The same shall apply hereinafter) is formed of a hub part (402), multiple spoke parts (411) radially extending from the hub part (402), and a rim part (410) connecting leading end portions of the multiple spoke parts (411). A disc attachment boss (420) is provided standing on one side of each of the spoke parts (411) at a middle thereof. Moreover, a reinforcing rib (430) is provided between each of the disc attachment bosses (420) and the hub part (402).

In FIG. 7 of Japanese Patent Application Publication No. 2008-030648, since the reinforcing rib (430) is provided between the disc attachment boss (420) and the hub part (402), the rigidity of the spoke part (411) is increased. The increased rigidity of the spoke part (411) hardly allows the spoke part (411) to be twisted when a braking force is applied to a brake disc and a force is applied to the disc attachment boss (420).

However, the structure of Japanese Patent Application Publication No. 2008-030648 has the following problems with the reinforcing rib (430) provided between the disc attachment boss (420) and the hub part (402). More specifically, the reinforcing rib (430) increases the weight of the wheel and also increases the material cost.

SUMMARY AND OBJECTS OF THE INVENTION

An object of an embodiment of the present invention is to provide a technique in a wheel structure for a saddle-ride type vehicle in which a brake disc is attached to one side of a spoke part at a middle portion thereof, the technique achieving suppression of the amount of deformation of the spoke part during braking and reductions in weight and cost of the wheel.

A first aspect of an embodiment of the preset invention provides a wheel for a saddle-ride type vehicle including a hub part supported on an axle, a multiple spoke parts extending outwardly from the hub part, and a rim part which is provided outside the multiple spoke parts and on which a tire is mounted. Disc attachment boss parts are provided to which a brake disc is attached. Each of the above items is provided, in a manner disposed in a vehicle width direction, integrally on one side of a corresponding one of the multiple spoke parts at a middle position thereof in a radial direction of the wheel. The wheel includes the multiple spoke parts each having a crotch part wherein one hub-side spoke part splits into two rim-side spoke parts in a vehicle side view, and the disc attachment boss parts are provided respectively on the crotch parts.

According to an embodiment of the preset invention, a radial distance from an axial center of the wheel to each of the disc attachment boss parts is set half or longer but ⅘ or shorter of a radial distance from the axial center of the wheel to an outer circumference of the wheel.

According to an embodiment of the preset invention, a disc attachment seating surface for attaching the brake disc thereto is formed on each of the disc attachment boss parts, and a length of the disc attachment seating surface in a wheel circumferential direction is set longer than a length of the disc attachment seating surface in the radial direction of the wheel.

According to an embodiment of the preset invention, a first recessed parts is formed in a surface of each of the hub-side spoke parts on an opposite side to the corresponding disc attachment boss part, the first recessed part extending in a longitudinal direction of the spoke part, and the first recessed part extends to an inner side of an outer circumference of the hub part in the radial direction.

According to an embodiment of the preset invention, a second recessed part is formed in a bottom portion of each of the first recessed parts, on a back side of the disc attachment boss parts.

According to an embodiment of the preset invention, a bottom portion of each of the second recessed parts is located at an outer side, in the vehicle width direction, of a line obtained by moving an outer edge of the corresponding spoke part symmetrically around a central line in the vehicle width direction, the outer edge being an edge formed on the first-recessed-part side.

According to an embodiment of the preset invention, a through-hole is provided in the hub part, a bearing supported on the axle is provided in the through-hole, and on an inner wall of the through-hole, multiple bearing-abutting step parts with which the bearing is locked are provided apart from one another in a circumferential direction of the through-hole.

According to an embodiment of the preset invention, the spoke parts of the wheel are each provided with the one hub-side spoke part and the two rim-side spoke parts with the Y-shape.

In a conventional wheel having straight-type spoke parts, reinforcing rib parts are added in some cases to the spoke parts so as to suppress deformation of the wheel due to a twisting moment in braking. If the ribs or the like are added to the spoke parts, however, this may increase the weight and cost of the wheel.

In this respect, according to an embodiment of the preset invention, a leading end of the one hub-side spoke part is branched into the two rim-side spoke parts. With such spoke parts, twisting of the spoke parts is suppressed with a small amount of the material, without adding ribs to the straight-type spoke parts. Thus, reductions in weight and material cost of the wheel are achieved.

According to an embodiment of the preset invention, the disc attachment boss parts which are provided on the spoke parts and to which a braking force is applied are each disposed at the middle position of the radius of the wheel in the radial direction, or at a position closer to the outer side than the middle position.

If the disc attachment boss parts are disposed at positions closer to an inner side of the wheel, a braking force is received by the spoke parts at positions closer to the hub part. Since the braking force is received at positions away from an outer circumference of the rim, the length of a portion on which the twisting moment acts is long, and the twisting angle formed at the disc attachment boss part of each spoke part is large.

In this respect, according to an embodiment of the preset invention, each of the disc attachment boss parts is disposed at the middle position of the radius of the wheel, or at the position closer to the outer side of the wheel than the middle position. Accordingly, a braking force is received at the middle positions of the radius of the wheel, or the positions closer to the outer circumference of the wheel than the middle positions. Since it is possible to receive the braking force at positions closer to the outer circumference of the rim, the length of a portion on which the twisting moment acts is short, and the twisting angle formed at the disc attachment boss part of each spoke part is decreased.

Since the twisting angle formed at each spoke part is decreased, the spoke part can be formed thinner by a suppressed amount of deformation in the spoke part. Accordingly, reductions in weight and material cost of the wheel are achieved.

Thus, according to an embodiment of the preset invention, a wheel structure for saddle-ride type vehicle is provided that achieves an increase in the twisting rigidity and also a reduction in the weight and the material cost. Moreover, the improvement in rigidity can suppress brake noise.

According to an embodiment of the preset invention, a force in a circumferential direction of the wheel is applied mainly from the brake disc to the disc attachment boss parts in braking. In such disc attachment boss parts, since the length of the disc attachment seating surface in the wheel circumferential direction is set longer than the length of the disc attachment seating surface in the wheel radial direction, the rigidity of the disc attachment boss parts in the circumferential direction can be increased. This contributes to an improvement in the twisting rigidity of the spoke parts. In other words, by forming the disc attachment boss parts longer in the direction in which a braking force is applied and making the wheel-radial length shorter, it becomes possible to increase the rigidity of the disc attachment boss parts with a small amount of the material therefor.

According to an embodiment of the preset invention, since the first recessed part is formed in each spoke part, a further reduction in weight of the wheel is achieved. Moreover, since the first recessed part extends to the inner side of the outer circumference of the hub part in the radial direction, the hub part and the spoke parts altogether can receive a load, thus making the wheel have little concentrated stress.

According to an embodiment of the preset invention, the second recessed part is formed in the bottom portion of the first recessed part, on the back side of the disc attachment boss part. Thus, a further reduction in the weight of the wheel is achieved.

According to an embodiment of the preset invention, the bottom portion of the second recessed part is located at the outer side, in the vehicle width direction, of the line obtained by moving the outer edge of the spoke part symmetrically around a central line of the vehicle-width-direction, the outer edge being an edge formed on the first-recessed-part side.

This makes it possible to improve the flowability in molding the wheel by die casting and to achieve reduction in weight of the wheel.

According to an embodiment of the preset invention, since the multiple bearing-abutting step parts are provided apart from one another in the circumferential direction on the inner wall of the through-hole, the bearing-abutting step parts can be formed with a small amount of the material in comparison with a case where abutting step parts are provided on the entire circumference in the circumferential direction. Thus, reductions in weight and cost of the wheel are achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) to 7(d) show a side view of a wheel according to an embodiment and a cross-sectional view of a principal portion thereof, and also shows a side view of a wheel according to a comparative embodiment and a cross-sectional view of a principal portion thereof.

DETAILED DESCRIPTION OF THE PREFERRED EMBODIMENTS

Figure 1:
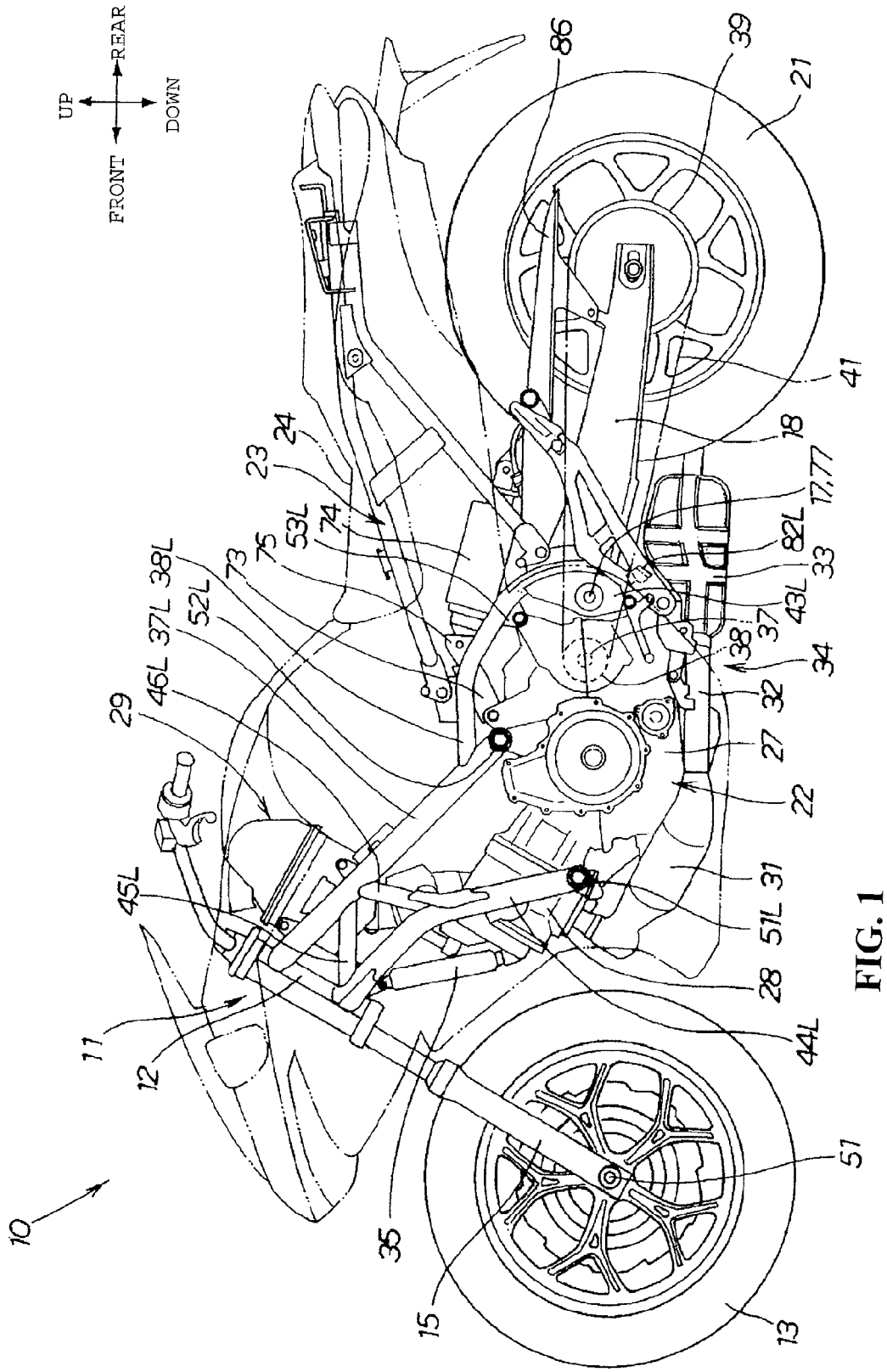
FIG. 1 is a left side view of a motorcycle according to the present invention.

Hereinafter, a detailed description will be given for an embodiment mode of the present invention. In the drawings and in an embodiment, "up," "down," "front," "rear," "left," and "right" indicate directions seen from the driver who rides on a motorcycle. In addition, the drawings are intended to be seen in the direction in which reference numerals can be read properly.

As shown in FIG. 1, a motorcycle 10 includes a vehicle body frame 11; a front fork 15 provided to a head pipe 12 constituting a front portion of the vehicle body frame 11, the front fork 15 steerably supporting a front-tire wheel 13; a pivot shaft 17 provided at a rear portion of the vehicle body frame 11; a swingarm 18 extending rearward from the pivot shaft 17 with a rear-tire wheel 21 attached to a rear end portion of the swingarm 18. An engine 22 is suspended from the vehicle body frame 11 with the engine 22 serving as a driving source. A seat rail 23 extends rearwardly from the rear portion of the vehicle body frame 11 with an occupant seat 24 for an occupant to sit thereon. The occupant seat 24 is supported on the seat rail 23 and disposed between the front-tire wheel 13 and the rear-tire wheel 21. Since an occupant rides the vehicle while straddling the occupant seat 24, this type of vehicle is called a saddle-ride type vehicle.

The engine 22 as the driving source includes a crankcase 27, a cylinder part 28 extending from the crankcase 27 in an obliquely upward direction of the vehicle; an air-intake member 29 disposed above the cylinder part 28 with an air-exhaust member 34 extending below the cylinder part 28. The air-exhaust member 34 includes a catalyzer 31, an exhaust pipe 32 and a silencer 33. A radiator unit 35 is disposed in front of the cylinder part 28.

A drive sprocket 38 is attached to a drive shaft 37 to which a driving force of the engine 22 is outputted. A driven sprocket 39 is attached to the rear-tire wheel 21 disposed rearwardly of the engine 22. A chain 41 is wound between the driven sprocket 39 and the drive sprocket 38. The drive sprocket 38 at the engine side drives the driven sprocket 39.

Hereinafter, a detailed description will be given for the configuration of a front wheel.

Figure 2:
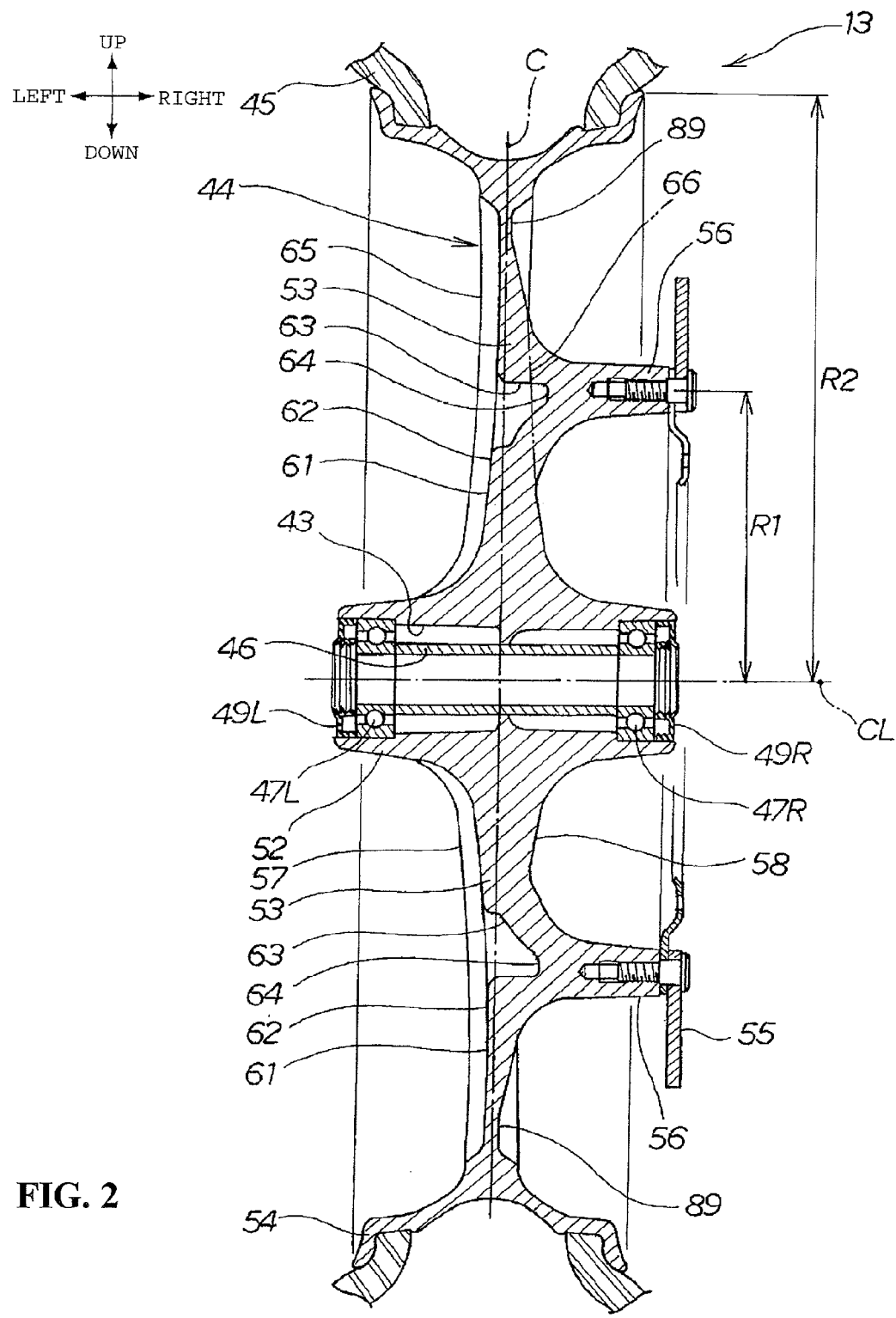
FIG. 2 is a cross-sectional view of a principal potion of the wheel according to the present invention.

As shown in FIG. 2, the main constituents of the front-tire wheel 13 serving as a vehicle wheel are a front wheel 44 having a through-hole 43 in a central portion thereof; a tire 45 mounted on an outer circumference of the front wheel 44; a collar member 46 inserted in the through-hole 43; left and right bearings 47L, 47R respectively inserted on both sides of the collar member 46; and sealing members 49L, 49R respectively inserted on the outer sides of the left and right bearings 47L, 47R.

The front wheel 44 (hereinafter, may be referred to as simply a "wheel 44") is formed of a hub part 52 supported on an axle 51 in FIG. 1; multiple spoke parts 53 extending outward from the hub part 52; and a rim part 54 which is provided outside the multiple spoke parts 53 and on which the tire 45 is mounted. The wheel 44 includes disc attachment boss parts 56 to which a brake disc 55 is attached. Each of the disc attachment boss parts 56 is provided, in a manner standing in a vehicle width direction, integrally on one side (right side) of a corresponding one of the multiple spoke parts 53, at a middle portion thereof in a radial direction of the wheel 44.

A first recessed part 61 is formed in each spoke part 53, on a surface 57 opposite to a surface 58 where the corresponding disc attachment boss part 56 is formed, the first recessed part 61 extending in a longitudinal direction of the spoke part 53. A second recessed part 63 is formed in a bottom portion 62 of each of the first recessed parts 61, on a back side of the disc attachment boss part 56. A bottom portion 64 of the second recessed part is located at an outer side, in the vehicle width direction, of a line 66 obtained by moving an outer edge 65 of the spoke part 53 symmetrically around a vehicle-width-direction central line C, the outer edge 65 being an edge formed on the first-recessed-part side.

Figure 3:
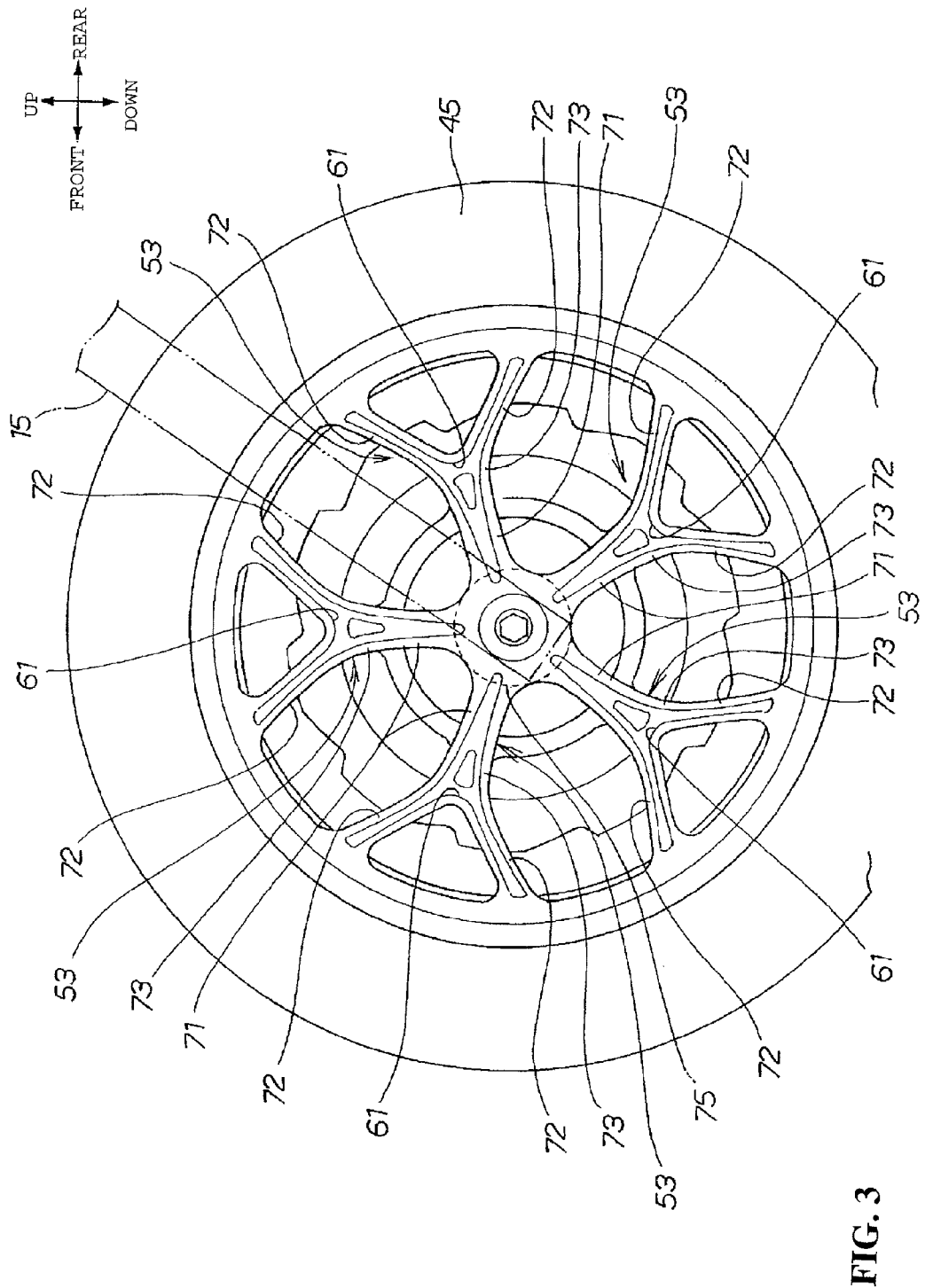
FIG. 3 is a left side view of a front-tire wheel provided to the motorcycle according to the present invention.

As shown in FIGS. 2 and 3, each of the five spoke parts 53 has a crotch part 73 wherein one hub-side spoke part 71 splits into two rim-side spoke parts 72, 72 in the vehicle side view. The disc attachment boss part 56 is provided on the crotch part 73. In addition, a radius (R1) from an axial-direction central line CL of the wheel 44 to the disc attachment boss part 56 is set half of a radius (R2) from the axial-direction central line CL of the wheel 44 to an outer circumference of the wheel.

The first recessed part 61 is formed in each hub-side spoke part 71, on the surface 57 opposite to the surface 58 where the disc attachment boss part 56 is formed, the first recessed part 61 extending in the longitudinal direction of the spoke part 53. The first recessed part 61 extends to the inner side of an outer circumference 75 of the hub part in a radial direction.

Since the first recessed part 61 is formed in each spoke part 53, a further reduction in the weight of the wheel 44 is achieved. Moreover, since the first recessed part 61 extends to the inner side of the outer circumference 75 of the hub part in the radial direction, when a high load is applied from an axle shaft that is not illustrated, the hub part 52 and the spoke parts 53 altogether can receive the load, thus making the wheel 44 have little concentrated stress.

Next, a description will be given for the state of the front wheel in the right side view of the vehicle.

Figure 4:
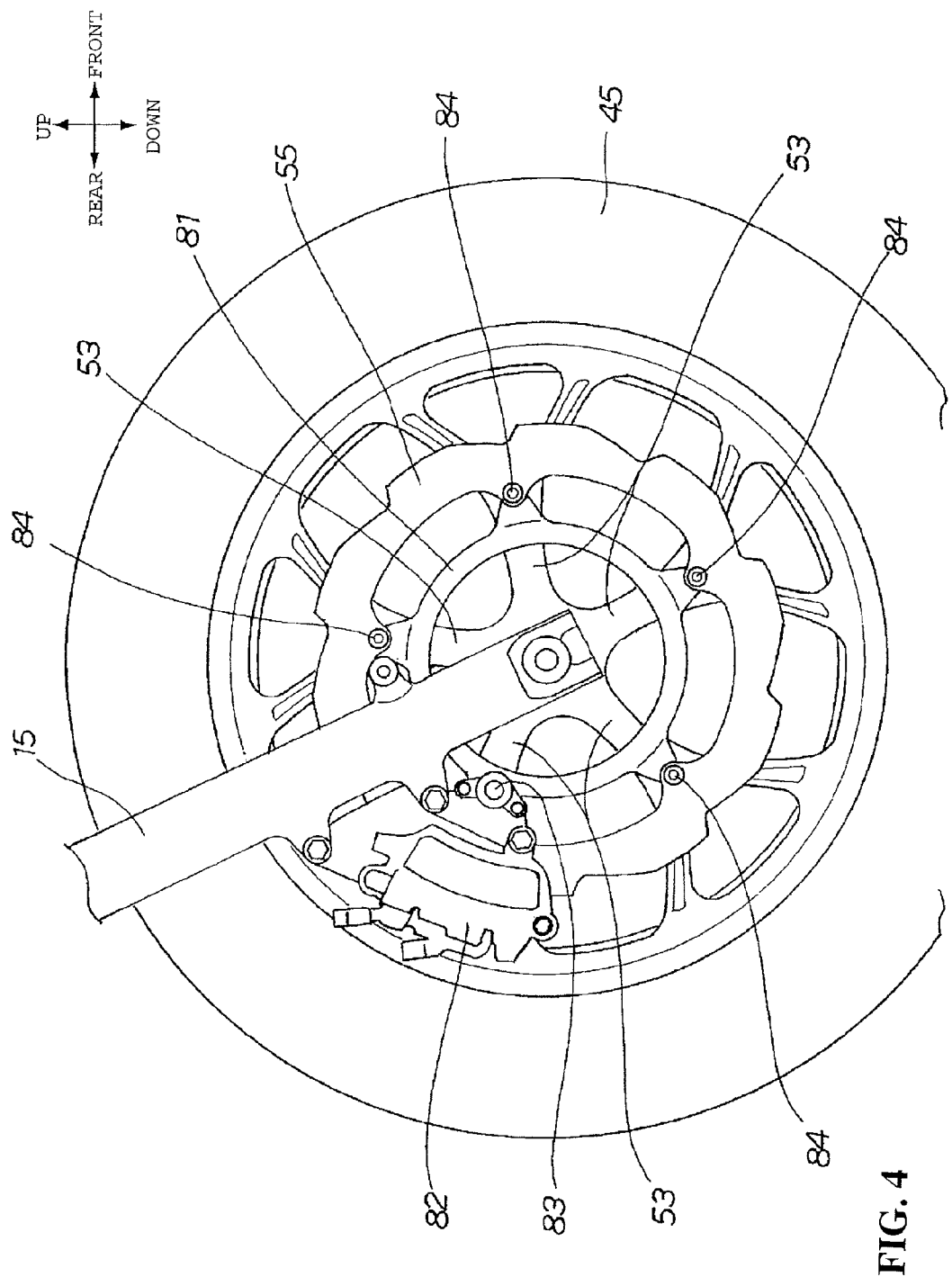
FIG. 4 is a right side view of the front-tire wheel provided to the motorcycle according to the present invention.

As shown in FIG. 4, a pulse ring 81 for detecting the wheel speed is disposed at the right side of the spoke parts 53 while the brake disc 55 is disposed at an outer side of the pulse ring 81. The brake disc 55 and the pulse ring 81 are fastened together with fastening members 84. Thereby, an increase in the number of the fastening members 84 can be suppressed. To the front fork 15, a brake disc caliper 82 and a wheel speed sensor 83 are attached. The brake disc caliper 82 is disposed in the vicinity of the pulse ring 81 and applies a braking force to the brake disc 55.

Figure 5:
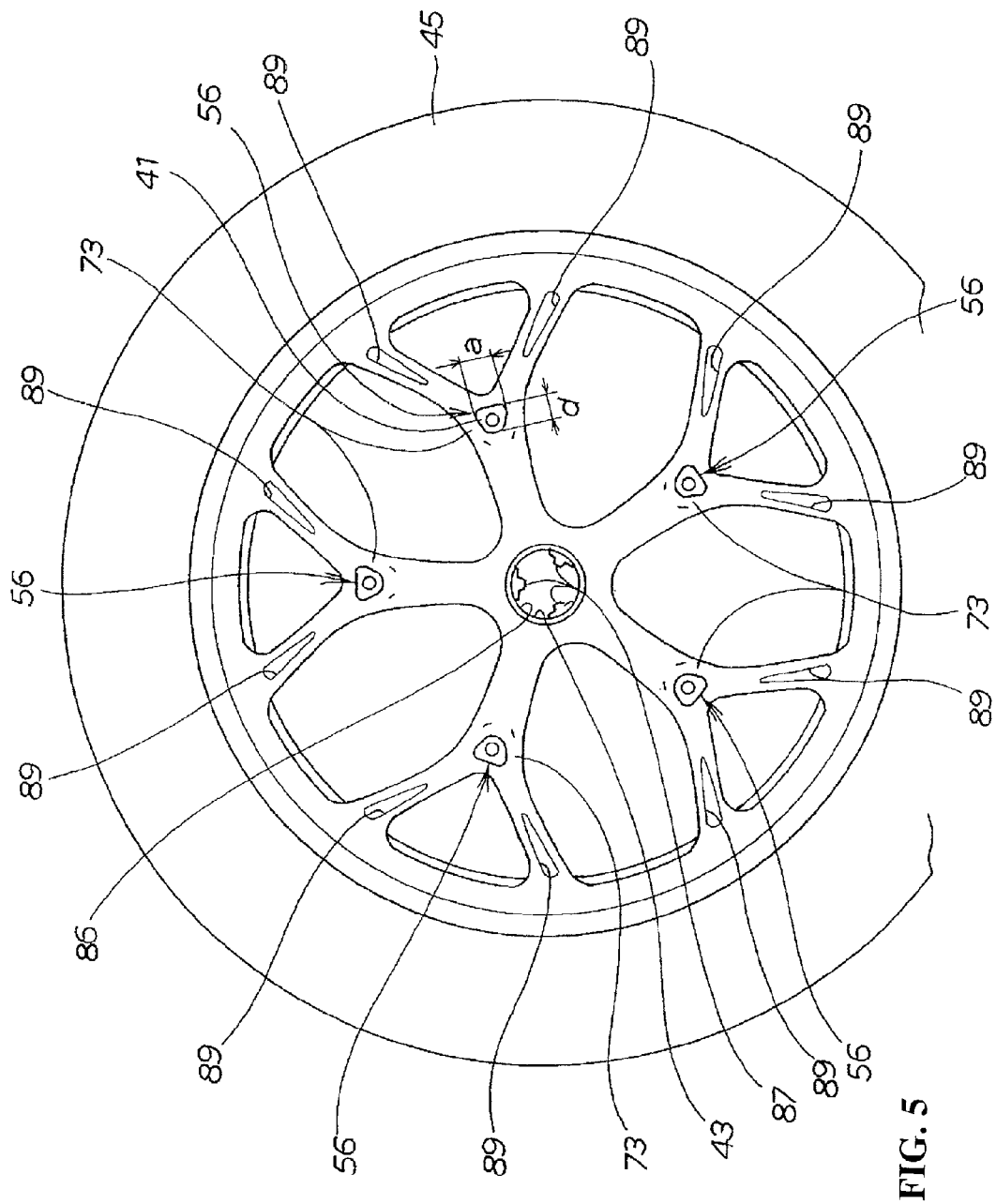
FIG. 5 is a right side view of the wheel according to the present invention.

As shown in FIG. 5, the five disc attachment boss parts 56 for attaching the brake disc (reference numeral 55 in FIG. 4) thereto are respectively provided at the crotch parts 73 of the spoke parts 53. In the rim-side spoke parts 72 outside the crotch parts 73 of the spoke parts 53, disc-side recessed parts 89 are respectively formed toward the rim part 54 along these spoke parts 72.

Note that, although the length of R1 is set half the length of the R2 in this embodiment, there would be no problem even if the length of R1 is set longer than the half but ⅘ or shorter within such a range that the brake disc caliper 82 does not exceed an outer circumference 88 of the wheel.

A length (a) of a disc attachment seating surface 91 in a wheel circumferential direction is set longer than a length (d) of the disc attachment seating surface 91 in a wheel radial direction.

Hereinafter, a description will be given for the through-hole which is opened in the hub part and through which the axle passes.

The through-hole 43 is provided in the hub part 52. The through-hole 43 includes the bearings 47L, 47R in FIG. 2 supported on the axle. On an inner wall 86 of the through-hole, multiple bearing-abutting step parts 87 with which the bearings 47L, 47R are locked are provided apart from one another in a circumferential direction of the through-hole.

Since the multiple bearing-abutting step parts 87 are provided apart from one another in the circumferential direction on the inner wall 86 of the through-hole, the bearing-abutting step parts 87 can be formed with a small amount of the material in comparison with a case where abutting step parts are provided on the entire circumference in the circumferential direction. Thus, reductions in the weight and cost of the wheel 44 are achieved.

Figure 6:
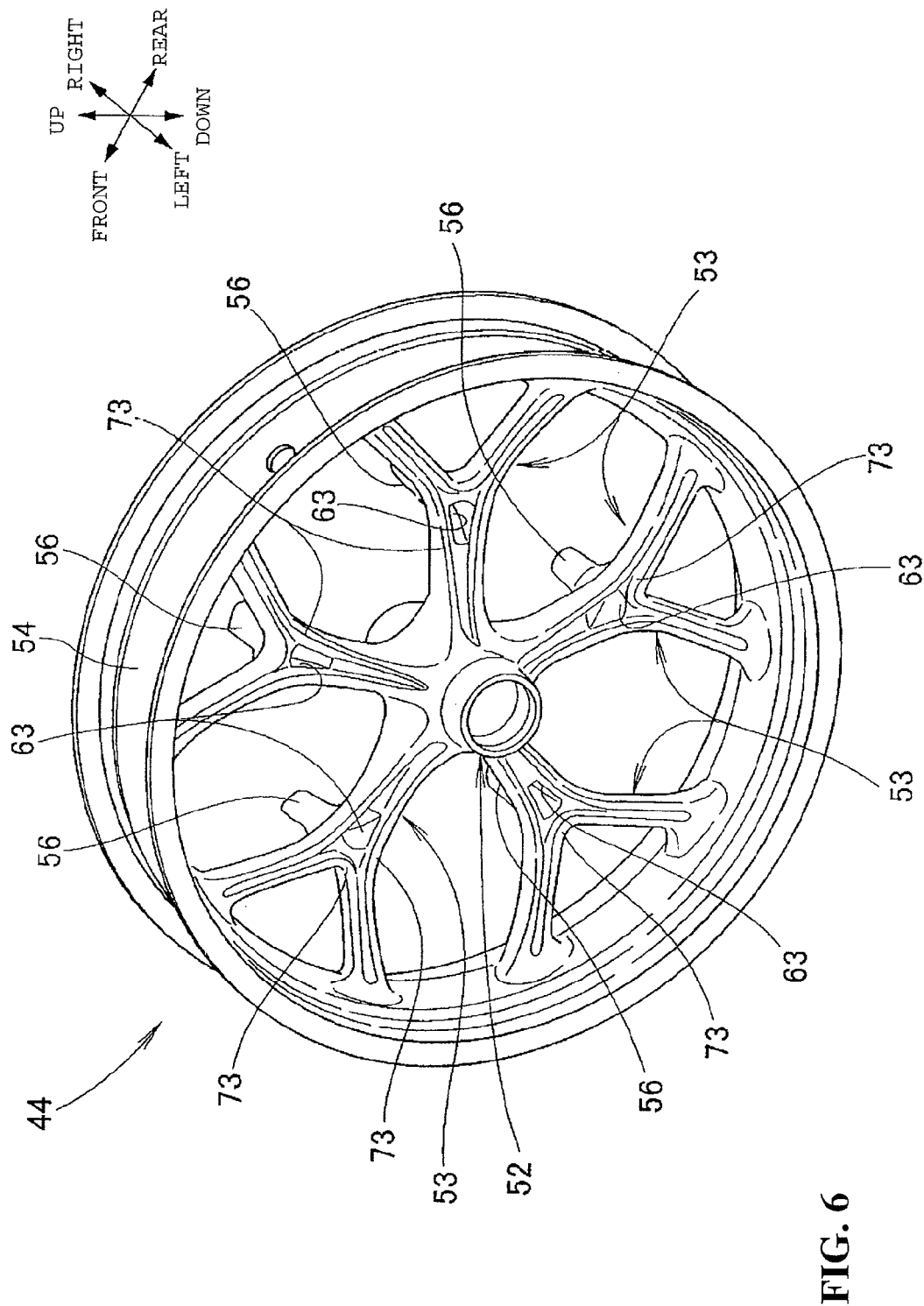
FIG. 6 is a perspective view of the wheel according to the present invention.

As shown in FIG. 6, the wheel 44 is formed of the hub part 52; the five spoke parts 53 extending outward from the hub part 52 and each having the crotch part 73; and the rim part 54 connecting the leading ends of the respective five spoke parts 53. In the crotch parts 73, the disc attachment boss parts 56 are respectively provided on the right side surfaces of the spoke parts 53, and project in the vehicle width direction. The first recessed parts 61 are respectively formed in the longitudinal directions of the spoke parts 53 on the left side surfaces which are opposite to the disc attachment boss parts of the spoke parts 53. The second recessed parts 63 are respectively formed on back surfaces of the disc attachment boss parts 56 on the same left side surfaces.

While referring also to FIG. 2, the bottom portion 64 of each second recessed part is located at the outer side, in the vehicle width direction, of the line 66 obtained by moving the outer edge 65 of the spoke part 53 symmetrically around the vehicle-width-direction central line C, the outer edge 65 being edge formed on the first-recessed-part side. This makes it possible to improve the flowability in molding the wheel 44 by die casting and to achieve reduction in weight of the wheel 44.

Next, a description will be given for the operations of the wheel of the motorcycle described above.

FIG. 7(a) shows a side view of the wheel according to the embodiment. The five spoke parts 53 constituting the wheel are each provided with the one hub-side spoke part 71 and the rim-side spoke parts 72, 72 with the Y-shape.

FIG. 7(b) shows a cross-sectional view of a principal portion of FIG. 7(a). When a braking force is applied to the brake disc, a twisting moment Mb is applied to the spoke parts 53.

FIG. 7(c) shows a side view of a wheel according to a comparative embodiment. In a conventional wheel 44B having straight-type spoke parts 53B, reinforcing rib parts 94 are provided on the spoke parts so as to suppress the deformation of the spoke parts due to a twisting moment in braking.

FIG. 7(d) shows a cross-sectional view of a principal portion of FIG. 7(c). When the ribs 94 are added to the spoke parts 53B, the twisting rigidity of the spoke parts is increased, but there is a problem in that the weight and cost of the wheel 44B are increased.

In FIG. 7(a), a leading end of the one hub-side spoke part 71 is branched into the two rim-side spoke parts 72, 72. Thus, the twisting rigidity of the spokes can be easily improved with a small amount of material in comparison with the case where the ribs 94 are added to the straight-type spoke parts 53B. As a result, reductions in the weight and material cost of the wheel are achieved while the twisting rigidity is improved.

In addition, the disc attachment boss parts 56 which receive a braking force are each disposed at the middle point in the radius of the wheel 44.

In FIG. 7(d), disc attachment boss parts 56B are disposed close to a hub part located close to an inner side of the wheel 44B (R1d<Dd). Accordingly, a braking force is received at positions closer to the center of the wheel 44B. In other words, since the braking force is received at positions away from an outer circumference of the rim, the length of a portion on which the twisting moment acts is long, and the twisting angle formed at the disc attachment boss part of each spoke part 53B is large.

In the present invention, as shown in FIG. 7(b), each of the disc attachment boss parts 56 is disposed at the middle point that is closer to an outer side of the wheel 44 than the counterpart in FIG. 7(d) (R1b=Db). Thereby, a braking force is received at positions closer to an outer circumference of the wheel 44 than the counterpart in FIG. 7(d). Since the disc attachment boss part 56 can be disposed closer to an outer circumference of the rim, the portion on which the twisting moment acts is short, and the twisting angle formed at each spoke part 53 is decreased in comparison with the counterparts in FIG. 7(d).

Since the twisting angle formed at each spoke part 53 is decreased, the spoke part 53 can be formed thinner by a suppressed amount of deformation in the spoke part 53. Accordingly, reductions in the weight and material cost of the wheel 44 are achieved.

Thus, the present invention provides a wheel structure for saddle-ride type vehicle achieving an increase in the twisting rigidity and also reductions in weight and material cost.

In FIG. 5, a force in a circumferential direction of the wheel is applied mainly from the brake disc 55 to the disc attachment boss parts 56 in braking. In such disc attachment boss parts 56, since the length (a) of each disc attachment seating surface 91 in the wheel circumferential direction is set longer than the length (d) of the disc attachment seating surface 91 in the wheel radial direction, the strength of the disc attachment boss parts 56 in the circumferential direction can be increased. This contributes to further improvement in the twisting rigidity of the spoke parts 53. In other words, by forming the disc attachment boss parts 56 longer in the direction in which a braking force is applied and making the length in the wheel radial direction shorter, it becomes possible to increase the rigidity of the disc attachment boss parts 56 with a small amount of the material therefore.

Note that, although applied to the motorcycle in the embodiment, the present invention is also applicable to a so-called saddle-ride type three wheeler (three wheel buggy). There would be no problem in applying the present invention to a general vehicle.

The present invention is suitable for a wheel structure for motorcycle in which a spoke part includes a disc attachment boss part for attaching a brake disc thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel structure for saddle-ride type vehicle, comprising:
    a wheel having:
        a hub part supported on an axle;
        a plurality of spoke parts extending outward from the hub part; and
        a rim part which is provided outside the plurality of spoke parts and on which a tire is mounted; and
    disc attachment boss parts to which a brake disc is attached and each of which is provided, in a manner standing in a vehicle width direction, integrally on one side of a corresponding one of the plurality of spoke parts at a middle position thereof in a radial direction of the wheel;
    wherein the plurality of spoke parts each have a crotch part wherein one hub-side spoke part splits into two rim-side spoke parts in a vehicle side view, and the disc attachment boss parts are provided respectively on the crotch parts,
    wherein a first recessed part is formed in a surface of each of the hub-side spoke parts on an opposite side to the corresponding disc attachment boss part, the first recessed part extending in a longitudinal direction of the spoke part, and to an inner side of an outer circumference of the hub part in the radial direction, and
    wherein a second recessed part is formed in a bottom portion of each of the first recessed parts, on a back side of the disc attachment boss parts.

2. The wheel structure for saddle-ride type vehicle according to claim 1, wherein a radial distance from an axial center of the wheel to each of the disc attachment boss parts is set half or longer but ⅘ or shorter of a radial distance from the axial center of the wheel to an outer circumference of the wheel.

3. The wheel structure for saddle-ride type vehicle according to claim 1, wherein a disc attachment seating surface for attaching the brake disc thereto is formed on each of the disc attachment boss parts, and a length of the disc attachment seating surface in a wheel circumferential direction is set longer than a length of the disc attachment seating surface in the radial direction of the wheel.

4. The wheel structure for saddle-ride type vehicle according to claim 2, wherein a disc attachment seating surface for attaching the brake disc thereto is formed on each of the disc attachment boss parts, and a length of the disc attachment seating surface in a wheel circumferential direction is set longer than a length of the disc attachment seating surface in the radial direction of the wheel.

5. The wheel structure for saddle-ride type vehicle according to claim 1, wherein a bottom portion of each of the second recessed parts is located at an outer side, in the vehicle width direction, of a line obtained by moving an outer edge of the corresponding spoke part symmetrically around a central line in the vehicle width direction, the outer edge being an edge formed on the first-recessed-part side.

6. The wheel structure for saddle-ride type vehicle according to claim 1, wherein a through-hole is provided in the hub part;

a bearing supported on the axle is provided in the through-hole; and on an inner wall of the through-hole, a plurality of bearing-abutting step parts with which the bearing is locked are provided apart from one another in a circumferential direction of the through-hole.

7. The wheel structure for saddle-ride type vehicle according to claim 2, wherein a through-hole is provided in the hub part;

a bearing supported on the axle is provided in the through-hole; and on an inner wall of the through-hole, a plurality of bearing-abutting step parts with which the bearing is locked are provided apart from one another in a circumferential direction of the through-hole.

8. The wheel structure for saddle-ride type vehicle according to claim 3, wherein a through-hole is provided in the hub part;

a bearing supported on the axle is provided in the through-hole; and on an inner wall of the through-hole, a plurality of bearing-abutting step parts with which the bearing is locked are provided apart from one another in a circumferential direction of the through-hole.

9. The wheel structure for saddle-ride type vehicle according to claim 1, wherein a through-hole is provided in the hub part;

a bearing supported on the axle is provided in the through-hole; and on an inner wall of the through-hole, a plurality of bearing-abutting step parts with which the bearing is locked are provided apart from one another in a circumferential direction of the through-hole.

* * * * *